United States Patent [19]

Cammack, II et al.

[11] Patent Number: 5,236,761
[45] Date of Patent: Aug. 17, 1993

[54] DIMENSIONALLY STABLE REINFORCED FILM

[75] Inventors: T. Kregg Cammack, II, San Jose; Eugene F. Lopez, Sunnyvale, both of Calif.

[73] Assignee: Orcon Corporation, Union City, Calif.

[21] Appl. No.: 756,464

[22] Filed: Sep. 9, 1991

[51] Int. Cl.$^5$ ............................................. B32B 5/12
[52] U.S. Cl. .................................... 428/109; 428/105; 428/107; 428/108; 428/285; 428/294; 428/343; 428/346; 428/354; 428/355
[58] Field of Search ............... 428/105, 107, 108, 109, 428/285, 294, 343, 346, 354, 355

[56] References Cited

U.S. PATENT DOCUMENTS

| | | | |
|---|---|---|---|
| 3,391,039 | 7/1968 | Bascom et al. | 156/171 |
| 3,391,043 | 7/1968 | Bascom | 156/181 |
| 3,463,693 | 8/1969 | Bascom et al. | 156/361 |
| 3,496,053 | 2/1970 | Bascom et al. | 161/57 |
| 3,573,137 | 3/1971 | Bascom et al. | 156/428 |
| 3,582,443 | 6/1971 | Bascom | 161/57 |
| 3,669,790 | 6/1972 | Bascom et al. | 156/162 |
| 4,007,517 | 2/1977 | Turner et al. | 26/18.5 |
| 4,070,432 | 1/1978 | Tamaddon | 264/210 F |
| 4,087,577 | 5/1978 | Hendrickson | 428/110 |
| 4,101,525 | 7/1978 | Davis et al. | 528/309 |
| 4,295,905 | 10/1981 | Bascom et al. | 156/174 |
| 4,360,555 | 11/1982 | Bascom et al. | 428/107 |
| 4,372,801 | 2/1983 | Bascom et al. | 156/434 |
| 4,474,585 | 10/1984 | Gruber | 51/298 |
| 4,622,254 | 11/1986 | Nishimura et al. | 428/102 |
| 4,624,886 | 11/1986 | Cogswell et al. | 428/245 |
| 4,695,509 | 9/1987 | Cordova et al. | 428/267 |

Primary Examiner—James J. Bell
Attorney, Agent, or Firm—Haverstock, Medlen & Carroll

[57] ABSTRACT

The invention provides a substantially flat film or metallized film, reinforced with regularly spaced reinforcing yarns in the fill and warp direction having a residual shrinkage of less than about 2.0%, which is dimensionally stable over a wide range of temperatures, along with a process for producing the same. Synthetic reinforcing yarns, including nylon yarns, can be preshrunk by heating the spooled yarn in an inert atmosphere for a sufficient period of time to reduce the residual shrinkage in the spooled yarn to less than about 2.0%. This preshrunk yarn can then be bonded to a film or metallized film substrate using a wide variety of adhesives, including hot melt adhesives, or water-based adhesives cured by application of heat. Because the residual shrinkage in the reinforcing fibers has been reduced, subsequent application of heat during manufacturing processes, or in the use environment, will not produce the curling or puckering of the film or separation of the metal layer.

8 Claims, 1 Drawing Sheet

DIMENSIONALLY STABLE REINFORCED FILM

TECHNICAL FIELD OF THE INVENTION

This invention relates generally to reinforced films. In particular, the present invention relates to films which use reinforcing fibers which are dimensionally unstable upon exposure to heat.

BACKGROUND OF THE INVENTION

Thin, flexible plastic films, such as Polypropylene, polyethylene, polyvinyl chloride, Tedlar ® (a registered trademark of E. I. DuPont ee Nemours & Co. for polyvinyl fluoride films), Mylar ® (a registered trademark of E. I. DuPont de Nemours & Co. for polyester films), and the like, have been found to be particularly useful as moisture, vapor and thermal barriers for a variety of products such as aircraft insulation blankets. These properties, especially thermal reflectance, can be improved by providing a thin, reflective metallized layer, typically on one side of the plastic film.

Such films, however, require reinforcement to enable them to withstand manufacturing and subsequent use. Reinforcement is generally provided by bonding reinforcing fibers to the film.

One way of providing a reinforced film is to cast the molten film plastic onto a scrim or reinforcing fibers so that the reinforcing fibers are carried within the film itself. This method is disadvantageous, however, since it requires the manufacturer to acquire the equipment needed for casting and forming the various flexible plastic films and for metallizing if practical.

Another way of providing reinforced film is to select the desired pre-formed film or metallized film, and reinforce the film by adhesively bonding the reinforcing fibers or yarns to at least one side of the film. Petroleum and organic based solvent adhesives have been widely used in the past to bond such reinforcing fibers to the film because of the speed of cure which is possible with such adhesives. However, the use of petroleum and organic based solvent adhesives is declining due to stricter air quality control laws. Further, solvent based adhesives may corrode aluminum, thus limiting the use of such reinforced films in aviation or in other environments in which aluminum is used. While the use of many water based adhesives and hot melt adhesives will meet present air quality standards, and will not corrode aluminum, the use of such adhesives in an industrial process for reinforcing films requires the application of heat to rapidly dry water based adhesives, or melt and cure hot melt adhesives to rapidly bond the reinforcing fibers to the plastic film. However, the application of heat to cure such environmentally acceptable adhesives has caused other problems, including severe curling and puckering of the reinforced film. In reinforced metallized film, in particular, the reinforcing fibers are sometimes preferably bonded to the metallized side to protect the metallized side of the film from abrasion and other environmental hazards. However, in addition to curling and puckering, when such reinforced metallized films are subjected to heating in subsequent manufacturing steps, for example during ultrasonic sealing operations, the metallic layer can be pulled away from the film, breaking the seal and adversely affecting the thermal reflectivity and other properties of the metallized film.

These are significant problems. Reinforced film which curls or puckers is difficult to handle during subsequent manufacture into useful products, as well as being cosmetically unacceptable. The curl is often so severe, that a subsequent manufacturing step is required to relax the curl. Lengths of the curled film are placed in large ovens for days at a time until the film relaxes sufficiently to enable its use, thus increasing both the cost and time for producing reinforced film. Thus, the need exists for a flexible, flat reinforced film which is thermally stable in all operating environments.

SUMMARY OF THE INVENTION

The present invention provides a flexible, flat reinforced film or metallized film which may be subsequently exposed to heat below the degradation temperature of the plastic film while remaining substantially dimensionally stable.

In one embodiment, the present invention provides a method for reinforcing a thin, flexible substrate with preshrunk reinforcing fibers using a water-based or hot-melt adhesive and heat to cure the adhesive and attach the reinforcing fibers to the substrate.

In another embodiment, the present invention provides a flat, flexible, reinforced substrate using the method.

In yet another embodiment, the present invention provides a method for preshrinking conventional, spooled threads or yarns which are used as reinforcing fibers for flat, flexible reinforced films.

BRIEF DESCRIPTION OF THE DRAWINGS

A better understanding of the invention and its advantages will be apparent from the detailed description taken in conjunction with the accompanying drawings in which.

DETAILED DESCRIPTION OF THE INVENTION

Figure 1:
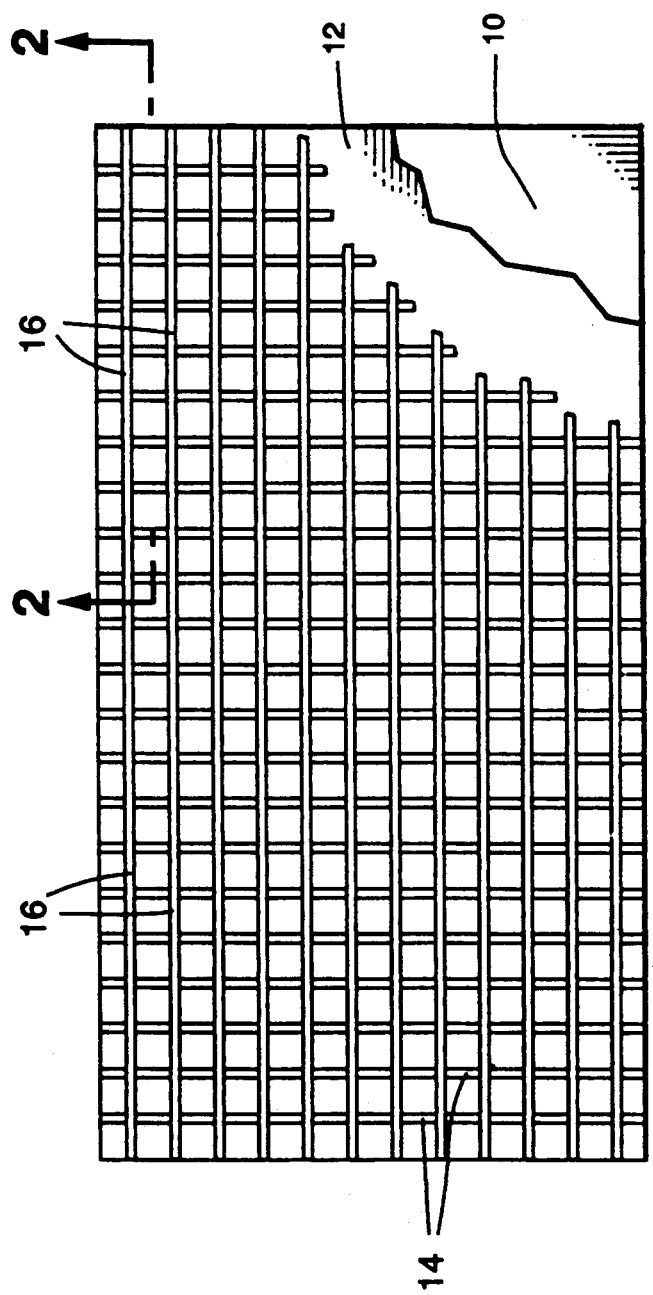
FIG. 1 is a top view of a reinforced flat film of the present invention.
Figure 2:
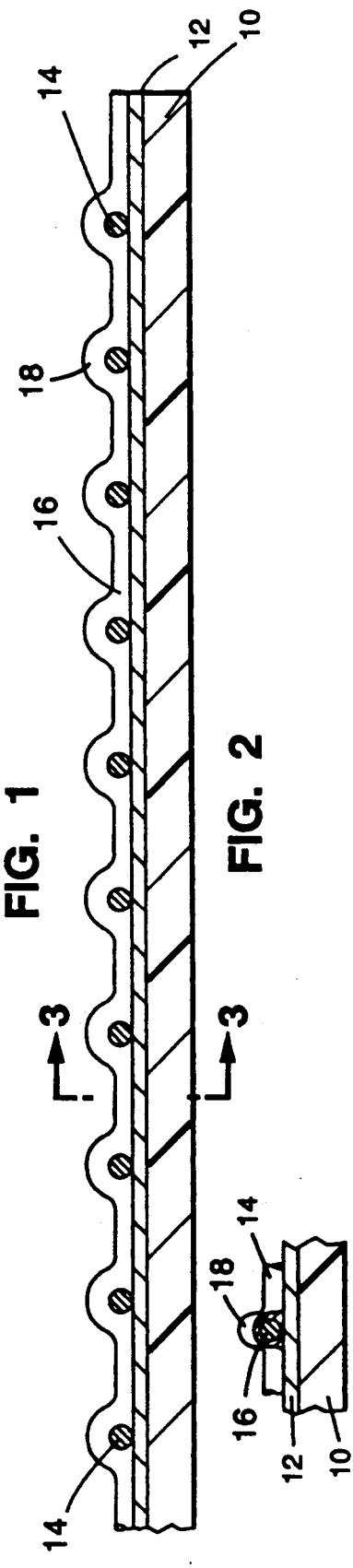
FIG. 2 is a cross sectional view of a reinforced flat film of the present invention taken through line 2—2 of FIG. 1; and, FIG. 3 is a cross-sectional view of a reinforced flat film of the present invention taken through line 3—3 of FIG. 2.
Figure 3:
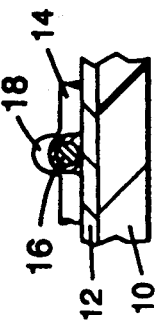

FIGS. 1-3 illustrate a basic configuration of a reinforced film of the present invention. Film 10 can be constructed of any thin, flexible, substantially dimensionally stable woven or non-woven substrate. Most preferably, film 10 is constructed from a plastic film such as, for example, polypropylene, polyethylene, polyvinyl chloride, Tedlar ®, Mylar ® or the like. If desired, film 10 can include a thin metallized layer 12.

Reinforcing fibers, preferably including both fill fibers or yarns 16 and warp fibers or yarns 14, are adhesively bonded to the film 10 or metallized layer 12. Such reinforcing fibers are preferably multifilament yarns having residual shrinkage of less than about 2.0%, preferably less than about 1.0%. The use of such reinforcing fibers having a residual shrinkage of less than about 2.0% has been found to be necessary when the adhesive 18 used to bond the reinforcing fibers are hot melt or water-based adhesives, because the amount of heat used to cure water based adhesives or to melt hot-melt adhesives will otherwise cause the reinforcing fibers to shrink.

In the reinforced film shown in the figures, the warp yarns 14 are laid down on the film first, followed by fill yarns 16, which are typically laid over the warp yarns 14. If reinforcing yarns are used which have a residual shrinkage of greater than about 2.0%, the application of heat during subsequent manufacturing steps (such as, for example, bonding the reinforcing fill yarns) will cause the warp yarns to shrink and the reinforced film to curl into a tube.

Conventional nylon reinforcing yarns are a preferable fiber for reinforcing plastic films. However, nylon reinforcing yarns, which are commercially available spooled on bobbins, typically experience about 9% shrinkage at 300 degrees fahrenheit. We have found that such nylon yarns can be preshrunk on their bobbins by subjecting the bobbins of spooled yarn to heat under controlled conditions. This is done by placing the spools of nylon yarn in a cool, sealed vacuum oven. The oven is evacuated to remove the oxygen, and the vacuum is released by filling the oven with nitrogen. The oven is then preferably heated to about 290 degrees fahrenheit to about 310 degrees fahrenheit, and is maintained at that temperature for a time sufficient to heat and shrink substantially all of the spooled nylon yarn, typically about 12 to about 20 hours. Then the oven and the spooled yarn are allowed to cool to ambient temperature before the oven seal is broken and the spools are removed from the oven. Following this process, the shrinkage in the nylon yarn so processed is reduced to less than about 2.0% and can be used to produce scrims for reinforcing or can be used directly as fill and warp yarns to reinforce films.

Such preshrunk nylon yarn can be precoated with hot melt adhesive, then used when required by positioning the hot melt coated yarn on the surface of the film 10 or metallized film 12 in the warp direction and applying heat sufficient to melt the adhesive and bond the warp yarns 14 to the film. Hot melt coated preshrunk fill yarns 16 can then be subsequently positioned in the fill direction, and bonded to the film when sufficient heat is applied to melt the adhesive. Preferably, the warp yarns 14 are not coated with adhesive, since the adhesive 18 coating the fill yarns 16 is typically sufficient to also bond the warp yarns 14 to the film, and enables both warp and fill yarns to be bonded to the film simultaneously.

The preshrunk nylon yarn can also be coated with liquid adhesives, such as water-based adhesive and used as both warp yarns 14 and fill yarns 16. The use of heat to evaporate water from the adhesive 18 will not cause the reinforcing yarns to shrink, and thus the film will not curl.

Other types of adhesives, in which the application of heat is not required or desirable, can also be used to bond the preshrunk yarn to the film 10. Because the reinforcing yarn is preshrunk, applications of heat to the reinforced film during subsequent manufacturing steps (for example, during ultrasonic sealing) will not cause deformation of the reinforced film, and possible separation of the metallic layer, due to shrinkage of the reinforcing fibers, which could destroy the ultrasonic seal.

While the preferred embodiments have been described in detail, and shown in the accompanying drawings, one skilled in the art will recognize that various further modifications are possible without departing from the scope of the invention as set forth in the appended claims.

I claim:

1. A flat, reinforced film comprising:
   a substantially dimensionally stable film substrate, said film substrate having a first side and a second side;
   a plurality of reinforcing yarns, said reinforcing yarns having less than about 2.0% shrinkage when subjected to heat, said reinforcing yarns bonded to the first side of said film substrate.

2. The film of claim 1 in which the reinforcing yarns include a plurality of yarns in the fill direction and in the warp direction, said warp yarns being substantially parallel to and regularly spaced apart from each other.

3. The film of claim 2 in which the fill yarns are substantially parallel to and regularly spaced apart from each other.

4. The film of claim 3 in which the reinforcing fill yarns overlay the reinforcing warp yarns.

5. The film of claim 4 in which only the reinforcing fill yarns are coated with an adhesive which bonds both the fill and warp yarns to the first side of the film substrate.

6. The film of claim 1 in which the reinforcing yarns are bonded to the first side of the film substrate using an adhesive selected from the group comprising hot melt adhesives and water based adhesives.

7. The film of claim 1 in which the film substrate additionally comprises a metallized layer bonded to one side of the film substrate.

8. The film of claim 7 in which the metallized layer is bonded to the first side of the film substrate and the reinforcing yarns are bonded to the metallized layer.

* * * * *